United States Patent [19]
Maeda et al.

[11] Patent Number: 5,675,559
[45] Date of Patent: Oct. 7, 1997

[54] DISC RECORDING REPRODUCING APPARATUS HAVING MEMORY CONTROL WHICH ALLOWS RECORDING IMMEDIATELY UPON LOADING OF THE DISC

[75] Inventors: Yasuaki Maeda, Kanagawa; Hideki Nagashima; Kosuke Nakamura, both of Tokyo, all of Japan

[73] Assignee: Sony Corporation, Tokyo, Japan

[21] Appl. No.: 503,020

[22] Filed: Jul. 17, 1995

[30] Foreign Application Priority Data

Jul. 29, 1994 [JP] Japan ................... 6-196164

[51] Int. Cl.⁶ ............................................. G11B 17/22
[52] U.S. Cl. ........................ 369/32; 369/48; 369/54
[58] Field of Search ........................... 369/32, 33, 13, 369/54, 59, 60, 83, 47, 48, 58, 53, 50, 44.32, 49

[56] References Cited

U.S. PATENT DOCUMENTS

| | | | |
|---|---|---|---|
| 5,243,588 | 9/1993 | Maeda | 369/54 |
| 5,392,265 | 2/1995 | Takezawa | 369/32 |
| 5,457,672 | 10/1995 | Shinada et al. | 369/47 |
| 5,477,516 | 12/1995 | Takezawa | 369/48 |
| 5,544,139 | 8/1996 | Aramaki et al. | 369/58 |
| 5,586,093 | 12/1996 | Honda et al. | 369/32 |
| 5,598,391 | 1/1997 | Makawa | 369/54 |

FOREIGN PATENT DOCUMENTS

| | | |
|---|---|---|
| 0 204 578 A3 | 12/1986 | European Pat. Off. . |
| 0473305 | 3/1992 | European Pat. Off. . |
| 0 554 858 A3 | 8/1993 | European Pat. Off. . |
| 0 586 189 A2 | 3/1994 | European Pat. Off. . |
| 0 601 814 A2 | 6/1994 | European Pat. Off. . |
| 0 621 596 A2 | 10/1994 | European Pat. Off. . |
| 4-351748 | 12/1992 | Japan . |
| 5-109074 | 4/1993 | Japan . |

*Primary Examiner*—Ali Neyzari
*Attorney, Agent, or Firm*—Limbach & Limbach, L.L.P.

[57] ABSTRACT

A recording and/or reproducing apparatus having a memory controller which controls a writ-in and read-out operation of data into the memory. When data are recorded on a disc-shaped recording medium by the recording and/or reproducing unit, the memory controller time-divisionally stores into a first storage area of a memory the data which will be recorded on the disc-shaped recording medium by the recording and/or reproducing unit while simultaneously time-divisionally storing into a second storage area of the memory management data for the disc-shaped recording medium which are read out by the recording and/or reproducing unit.

4 Claims, 10 Drawing Sheets

FIG. 5

| | 16bit | | 16bit | | |
|---|---|---|---|---|---|
| | MSB    LSB | MSB    LSB | MSB    LSB | MSB    LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000010 | 3 |
| | 00000000 | 00000000 | 00000000 | 00000000 | 4 |
| | 00000000 | 00000000 | 00000000 | 00000000 | 5 |
| | "M" | | "N" | | 6 |
| | Disc type | Rec power | First TNO | Last TNO | 7 |
| | Read out start address (LO$_A$) | | | Used Sectors | 8 |
| | Power Calibration area Start address (PC$_A$) | | | 00000000 | 9 |
| | U-TOC Start address (UST$_A$) | | | 00000000 | 10 |
| | Recordable user area Start address (RST$_A$) | | | 00000000 | 11 |
| CORRESPONDING TABLE, INDICATION DATA PORTION { | 00000000 | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| (01h) | START ADDRESS | | | TRACK MODE | 78 |
| | END ADDRESS | | | 00000000 | 79 |
| (02h) | START ADDRESS | | | TRACK MODE | 80 |
| | END ADDRESS | | | 00000000 | 81 |
| (03h) | START ADDRESS | | | TRACK MODE | 82 |
| MANAGEMENT TABLE PORTION (255-PART TABLE) | END ADDRESS | | | 00000000 | 83 |
| (FCh) | START ADDRESS | | | TRACK MODE | 580 |
| | END ADDRESS | | | 00000000 | 581 |
| (FDh) | START ADDRESS | | | TRACK MODE | 582 |
| | END ADDRESS | | | 00000000 | 583 |
| (FEh) | START ADDRESS | | | TRACK MODE | 584 |
| | END ADDRESS | | | 00000000 | 585 |
| (FFh) | START ADDRESS | | | TRACK MODE | 586 |
| | END ADDRESS | | | 00000000 | 587 |

P-TOC SECTOR 0

FIG.6

| | ←──16bit──→ | | ←──16bit──→ | | |
|---|---|---|---|---|---|
| | MSB      LSB | MSB      LSB | MSB      LSB | MSB      LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | 00000000 | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| CORRESPONDING TABLE, INDICATION DATA PORTION { | Disc | ID | P-DFA | P-EMPTY | 11 |
| | P-FRA | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| MANAGEMENT TABLE PORTION (255-PART TABLE) { (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| (FCh) | START ADDRESS | | | TRACK MODE | 580 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

U-TOC SECTOR 0

DISC RECORDING REPRODUCING APPARATUS HAVING MEMORY CONTROL WHICH ALLOWS RECORDING IMMEDIATELY UPON LOADING OF THE DISC

BACKGROUND

1. Field of the Invention

The present invention relates to a recording and/or reproducing apparatus for a disc-shaped recording medium, and a memory control device for the recording and/or reproducing apparatus. More particularly, the present invention relates to a recording and/or reproducing apparatus using a memory for a disc-shaped recording medium, and a memory control device for the recording and/or reproducing apparatus.

2. Background of the Invention

A data rewritable magneto-optical disc on which an user can record music data or the like has been known, and also a recording and/or reproducing apparatus which is provided with a buffer memory to improve a vibration-proof function has been realized as a recording and/or reproducing apparatus for such a magneto-optical disc.

In such a recording and/or reproducing apparatus for a magneto-optical disc, music data which are read out from the magneto-optical disc are intermittently written into a buffer memory at a high transfer rate in a reproducing operation. On the other hand, the music data thus stored in the buffer are continuously read out from the buffer memory at a low transfer rate and then subjected to a decoding processing as audio reproduction signals. At this time, some amount of data are accumulated in the buffer memory at all times. Therefore, the audio data can be continuously read out from the buffer memory even if a track jump occurs due to external vibration (disturbance) or the like and thus the data read-out operation from the magneto-optical disc is temporarily interrupted. Consequently, reproduced sound which is output from the recording and/or reproducing can be prevented from being interrupted.

Furthermore, in a recording operation, input data are temporarily and continuously written into the buffer memory at a low transfer rate. Thereafter, the data thus stored are intermittently read out from the buffer memory, and supplied to a magnetic head or an optical head to perform a recording operation on the magneto-optical disc.

In the recording and/or reproducing apparatus as described above, clusters CL (=36 sectors) each of which composed of a sub data area of 4 sectors (1 sector=2352 bytes) and a main data area of 32 sectors are continuously formed on a recording track of the magneto-optical disc as shown in FIG. 1, and one cluster is used as the minimum unit for recording. One cluster corresponds to a track length of two to three rounds. An address is recorded every sector.

The sub data area of 4 sectors is used as a subcode data or a linking area, and TOC (Table Of Contents) data, audio data, etc. are recorded on the main data area of 32 sectors.

The sector is further divided into sound groups, and two sectors are divided into 11 sound groups, and data are recorded in a sound group of 424 bytes while divided into an L-channel and a R-channel. One sound group contains an audio data amount corresponding to a time of 11.6 msec. An area of 212 bytes which corresponds to a data area of the L-channel or R-channel is called a "sound frame".

When a recording and/or reproducing operation is performed through a buffer memory on those data which are recorded according to the above format on the magneto-optical disc, the data are stored into the buffer memory on a sector basis (every sector). That is, a sector address and a byte address (0 to 2351 byte) in a sector are composed of an access address, and a write-in and read-out operation is performed on the basis of the access address.

In the recording and/or reproducing apparatus as described above, each part of a signal recording/reproducing system is operated while switched between a reproduction mode and a recording mode. The signal recording/reproducing system includes a head unit having a magnetic head and an optical head to perform a signal recording or reproducing operation on the magneto-optical disc, and an EFM/CIRC encode/decode unit for performing a decode operation such as EFM (Eight to Fourteen Modulation)/CIRC (Cross Interleaved Reed-Solomon Code), etc. on signals read out by the head unit and performing an encode operation such as EFM/CIRC, etc. on signals supplied to the head unit for recording. Further, the signal recording/reproducing system includes the buffer memory as described above, a memory controller for controlling the buffer memory, and an audio compression encode/decode unit which is disposed between the buffer memory and the input/output terminals and performs an encode and decode operation on audio compression processing.

When the recording and/or reproducing apparatus is kept in a reproduction mode, the head unit reads out information from the magneto-optical disc through the optical head. The EFM/CIRC encode/decode unit functions as a decoder to decode the information read out from the magneto-optical disc, and supplies the decoded data to the buffer memory. The memory controller writes into the buffer memory data supplied from the EFM/CIRC encode/decode unit, and reads out data from the buffer memory and supplies the data to the audio compression encode/decode unit. The audio compression encode/decode unit functions as a decoder to decode data which have been recorded while compressed, and supplies the decoded data to an output terminal side.

On the other hand, when the recording and/or reproducing apparatus is kept in a recording mode, the audio compression encode/decode unit functions as an encoder to perform the audio compression encode processing on input audio signals, and supplies the compressed data to the buffer memory. The memory controller writes the data supplied from the audio compression encode/decode unit into the buffer memory, and reads out data from the buffer memory and supplies the data to the EFM/CIRC encode/decode unit. At this time, the EFM/CIRC encode/decode unit functions as an encoder to perform the data encode processing on the data read out from the buffer memory, and supplies the encoded data to the magnetic head of the head unit. The head unit records the supplied data on the magneto-optical disc with a perpendicular magnetic field produced from the magnetic head and light beams radiated from the optical head.

Each part of the recording and/or reproducing apparatus is operated in each of the reproducing mode and the recording mode as described above, however, it has been impossible for this recording and/or reproducing apparatus to start its recording operation just after a disc is loaded into the apparatus.

In order to perform the recording operation on the loaded magneto-optical disc, TOC data must be first read out from the loaded magneto-optical disc to identify a recordable area. The TOC data are read into the buffer memory to allow the system controller to refer to the data. Therefore, just when the magneto-optical disc is loaded, the recording and/or reproducing apparatus must be first operated in the reproducing mode. That is, information which is first read out by the optical head of the head unit is decoded in the EFM/CIRC encode/decode unit, and supplied into the buffer memory.

The recording and/or reproducing apparatus cannot be switched to the recording mode unless the above operation is completed. After the apparatus is set to the recording mode, the input audio data can be subjected to the audio compression encode in the audio compression encode/decode unit, and then written into the buffer memory. Therefore, the audio data which are input during the read-out operation of the TOC data cannot be recorded, and thus this recording and/or reproducing apparatus as described above cannot satisfy an urgent recording requirement.

A non-operation period in which the head unit for performing the read-out operation at a high rate and the EFM/CIRC encode/decode unit are not operated exists during the process of supplying the data read out from the buffer memory into the audio compression encode/decode unit and outputting the data from the audio compression encode/decode unit under the reproduction mode. It is timely possible to record renewed TOC data during this period, for example. However, if the whole system is in the reproduction mode, the head unit and the EFM/CIRC encode/decode unit cannot perform the recording operation, and thus it is impossible to perform the operation as described above.

SUMMARY OF THE INVENTION

It is therefore an object of the present invention to provide a recording and/or reproducing apparatus for a disc-shaped recording medium, which resolves the above-mentioned problem.

It is another object of the present invention to provide a memory control device for a recording and/or reproducing apparatus, which can resolve the above-mentioned problem.

According to one aspect of the present invention, there is provided a recording and/or reproducing apparatus for a disc-shaped recording medium having management data recorded thereon to manage recorded data, which includes a recording and/or reproducing unit, a memory and a memory controller. The recording and/or reproducing unit records data on the disc-shaped recording medium and/or reproduces recorded data from the disc-shaped recording medium. The memory temporarily stores therein data which are reproduced by the recording and/or reproducing unit, and temporarily stores therein data which are supplied to the recording and/or reproducing unit and recorded on the disc-shaped recording medium. The memory includes a first storage area for storing data which are produced from the disc-shaped recording medium by the recording and/or reproducing unit, or data which are supplied to the recording and/or reproducing unit and recorded on the disc-shaped recording medium, and a second storage area for storing the management data for the disc-shaped recording medium which are read out by the recording and/or reproducing unit. The memory controller controls a write-in and read-out operation of data into the memory. When data are recorded on the disc-shaped recording medium by the recording and/or reproducing unit, the memory controller stores into the first storage area of the memory the data which will be recorded on the disc-shaped recording medium by the recording and/or reproducing unit while storing into the second storage area of the memory the management data for the disc-shaped recording medium which are read out by the recording and/or reproducing unit.

According to another aspect of the present invention, there is provided a memory control device for a recording and/or reproducing apparatus, which includes first, second and third interface units, a selection unit, an address data generating unit and a controller. The first interface unit receives and transmits control data. The second interface unit receives and transmits recording data and/or reproduction data, and a data input/output mode of the second interface unit is switched by the first interface unit. A data input/output mode of the third interface unit is switched by the first interface unit. The selection unit performs a selective switching operation between the second and third interface units as a data access (input/output) destination for the memory. The address data generating unit generates write-in address and read-out address data for the memory. The controller performs the following control on the basis of the supplied control data. That is, on the basis of the supplied control data, the first interface unit sets the second and third interface units to the input mode, and in combination with the selection unit, it performs a selective switching operation between an operation of writing into the memory the data input through the second interface unit on the basis of the address data from the address generating unit and an operation of writing into the memory the data input through the third interface unit on the basis of the address data from the address data generating unit, whereby the data supplied through the second interface unit and the data supplied through the third interface unit are written in the memory.

According to another aspect of the present invention, there is provided a memory control device for a recording and/or reproducing apparatus, which includes first, second and third interface units, a selection unit and an address data generating unit. The first interface unit receives and transmits control data. The second interface unit receives and transmits recording data and/or reproduction data, and a data input/output mode of the second interface unit is switched by the first interface unit. At the data input mode time, the second interface unit is supplied with the reproduction data, and at the data output mode time, the second interface unit is supplied with the recording data. A data input/output mode of the third interface unit is switched by the first interface unit. At the data input mode time, the third interface unit is supplied with the recording data, and at the data output mode time the third interface unit is supplied with the reproduction data. The selection unit performs a selective switching operation between the second and third interface units as a data access (input/output) destination for the memory so as to match the data input/output mode which is set by the first interface unit. The address data generating unit generates data write-in address data and data read-out address data for the memory. When the second and third interface units are set to the data input mode by the first interface unit, the data input through the second interface unit are written into the memory according to the write-in address data from the address generating unit by the selection unit, and the data which are read out according to the read-out address data from the address data generating unit are supplied to the third interface unit by the selection unit. On the other hand, when the second and third interface units are set to the data output mode by the first interface unit, on the basis of the address data from the address data generating unit, the data from the second interface unit and the data from the third interface unit are selectively written into the memory. At this time, if the data write-in timing is coincident between the second and third interface units, the data from the second interface unit are written into the memory by the selection unit.

According to the present invention, when data are required to be recorded on the recording medium, the data to be recorded on the recording medium can be recorded while writing the management data from the loaded recording medium into the memory. Therefore, the head portion of the data to be recorded on the recording medium can be prevented from being unrecorded.

Furthermore, according to the present invention, the data input/output mode of the memory can be individually set, so that data can be written into the memory whole storing other data into the memory.

BRIEF DESCRIPTION OF THE DRAWINGS

FIG. 5 is a diagram showing a P-TOC sector of the disc;

FIG. 6 is a diagram showing an U-TOC sector of the disc;

DESCRIPTION OF THE INVENTION

A recording and/or reproducing apparatus for a disc-shaped recording medium according to the present invention will be described hereunder in detail with reference to the accompanying drawings. In the following embodiments, the present invention is applied particularly to a recording and/or reproducing apparatus using a magneto-optical disc as a recording medium and a memory control device therefor.

The description of the preferred embodiments will be made in the following order:

1. Construction of Recording and/or Reproducing Apparatus
2. P-TOC sector
3. U-TOC sector
4. Audio Data Sector
5. Storage Area of Buffer Memory
6. Construction of Memory Controller
7. Operation of Memory Controller

1. Construction of Recording and/or Reproducing Apparatus

Figure 2:
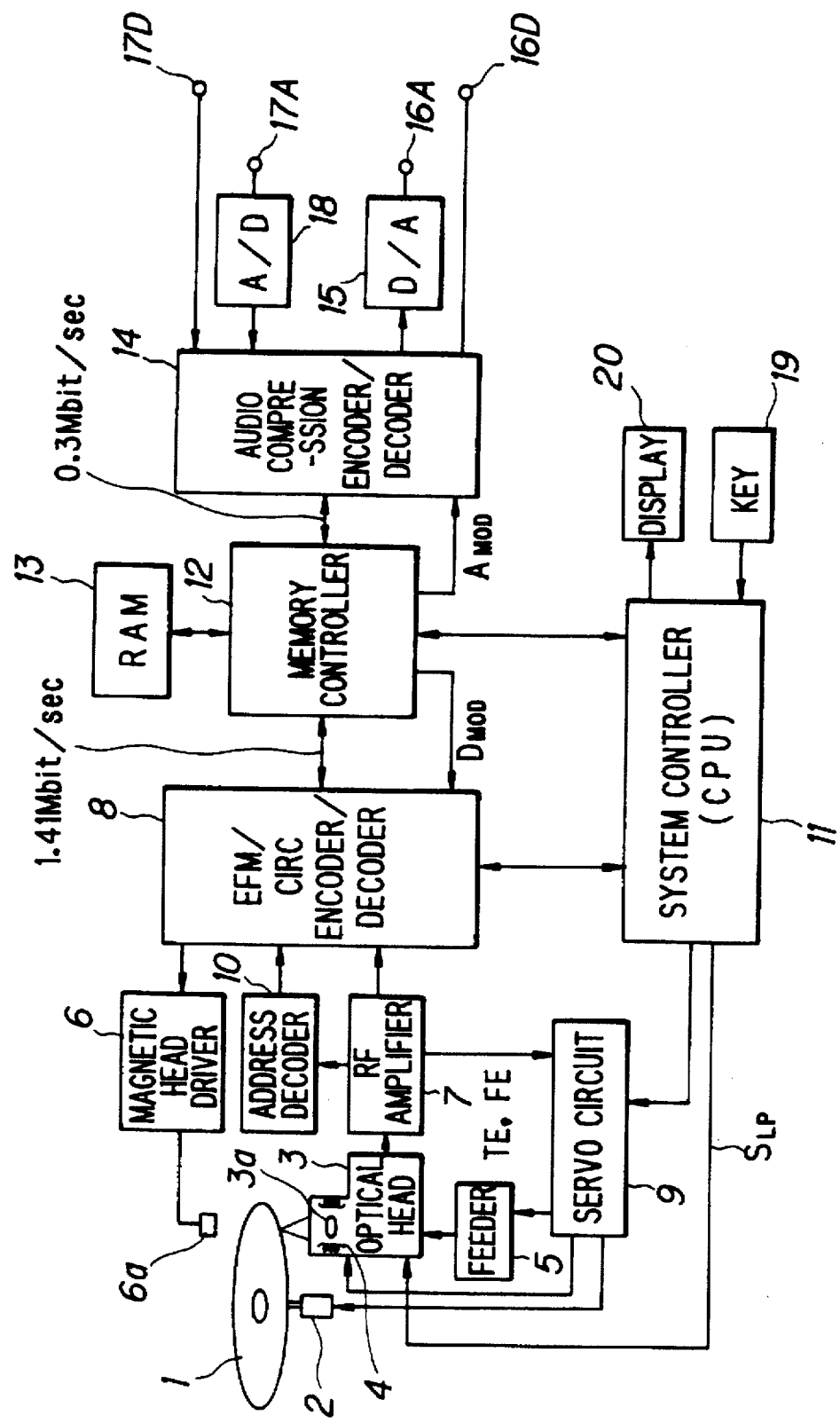
FIG. 2 is a block diagram showing a recording and/or reproducing apparatus of an embodiment according to the present invention.

FIG. 2 is a block diagram showing a main part of a recording and/or reproducing apparatus of an embodiment of the present invention.

In FIG. 2, a magneto-optical disc 1, on which data based on audio signals are recorded, is rotationally driven by a spindle motor 2. An optical head 3 irradiates a light beam onto the magneto-optical disc 1 at recording/reproduction modes. At a recording time, the optical head 3 outputs a light beam of high level power to heat the track of the magneto-optical disc 1 up to Curie temperature, and at a reproduction mode the optical head 3 outputs a light beam of a relatively low level power to detect data recorded on the magneto-optical disc on the basis of reflected light by using the magnetic Kerr effect.

The optical head 3 is equipped with a laser diode serving as a light source, an optical system having a polarization beam splitter, an objective lens 3a, etc., and a photodetector for detecting the reflected light beam reflected from the magneto-optical disc 1. The objective lens 3a is supported by an actuator 4 so as to be movable in a disc radial direction (i.e., in a tracking direction) and in such a direction as to approach to and be away from the disc (i.e., in a focusing direction).

A magnetic head 6a applies onto the magneto-optical disc 1 vertical magnetic fields which are modulated in accordance with supplied data, and it is disposed so that the magneto-optical disc 1 is sandwiched between the magnetic head 6a and the optical head 3. The optical head 3 and the magnetic head 6a are supported movably in the radial direction of the disc 1 by a feed mechanism 5.

In the reproducing operation, the output signal from the photodetector of the optical head 3 is supplied to an RF amplifier 7. The RF amplifier 7 performs calculation processing on the supplied signals to produce and extract an RF signal, a tracking error signal, a focus error signal, absolute position information (absolute position information which is recorded as a pre-groove (wobbling groove) formed on the magneto-optical disc 1), address information, a focus monitor signal, etc. The RF signal thus produced by the RF amplifier 7 is supplied to an encoder/decoder 8. The tracking error signal and the focus error signal are supplied to a servo circuit 9, and the address information is supplied to an address decoder 10. The absolute position information and the focus monitor signal are supplied to a system controller 11 which is composed of a microcomputer, for example.

The servo circuit 9 produces various servo driving signals on the basis of the tracking error signal, the focus error signal, a track jump command, a seek command, a rotational speed detection information of the spindle motor 2, etc. which are output from the system controller 11, and controls the actuator 4 and the feed mechanism 5 on the basis of these servo driving signals to perform focus control and tracking control and also controls the spindle motor 2 to rotate at a constant angular velocity (CAV) or constant linear velocity (CLV).

The RF signal outputted from the RF amplifier 7 is subjected to decode processing such as EFM demodulation, CIRC, etc. in the encoder/decoder 8, and then temporarily written into the buffer memory 13 by the memory controller 12. The data read-out from the magneto-optical disc 1 by the optical head 3 and the data transmission operation of reproduction data in a signal processing system extending from the optical head 3 to the buffer memory 13 are intermittently carried out at 1.41 Mbit/sec.

The data which are written in the buffer memory 13 are read out at such a timing that the transmission of the reproduction data is carried out at 0.3 Mbit/sec, and supplied to the encoder/decoder 14. The data which are read out from the buffer memory 13 are subjected to reproduction signal processing such as decode processing for the audio compression processing, and converted to analog signals by a D/A converter 15. The analog signals are supplied from an analog output terminal 16A to a prescribed amplifying circuit, and output as reproduction signals, for example, as analog signals of each of R- and L-channels. Furthermore, the data which are read out from the buffer memory 13 are supplied from the encoder/decoder 14 to the digital output terminal 16D, and output as digital data. For example, the buffer memory is composed of a RAM.

Here, the data write/read operation in and from the buffer memory 13 is carried out while a write-in pointer and a read-out pointer are controlled by the memory controller 12 to indicate an address. The write-in pointer (write-in address) is incremented at a timing of 1.41 Mbit/sec as described above, and the read-out pointer (read-out address) is incremented at a timing of 0.3 Mbit/sec. Some amount of data are allowed to be accumulated in the buffer memory 13 due to the difference between the write-in and read-out bit rates. The increment of the write-in pointer is stopped at the time when the buffer memory 13 is fully filled with data at a maximum, and the read-out operation of data from the magneto-optical disc 1 by the optical head 3 is also stopped. However, the increment of the read-out pointer is continued, so that the output signal at the output terminal 16A or 16D is not interrupted.

Thereafter, only the read-out operation of the data from the buffer memory 13 is continued, and if the data accumulation amount in the buffer memory 13 falls below a predetermined value at a point in time, the data read-out operation of the optical head 3 and the increment of the write-in pointer are resumed and the data are accumulated in the buffer memory 13 again.

The signals reproduced from the magneto-optical disc 1 are output through the buffer memory 13 as described above. Therefore, even when the tracking is out of control due to external disturbance or the like, the output of the reproduced signals is not interrupted, and the operation can be continued without adversely effecting the output of the reproduced signals by accessing a correct scanning position of the optical head 3 to resume the read-out of the data before the buffer memory 13 becomes empty. That is, the vibration-proof function can be improved.

In FIG. 2, the address information output from the address decoder 10 and the subcode data supplied for the control operation are supplied through the encoder/decoder 8 to the system controller 11, and used for various control operations.

Furthermore, a lock detection output signal of the PLL circuit for generating a bit clock for the recording/reproducing operation and a monitor signal representing a missing state of a frame synchronizing signal of reproduced data are also supplied to the system controller 11.

The system controller 11 outputs a laser control signal $S_{LP}$ for controlling the operation of the laser diode of the optical head 3 to control the on/off operation of the output of the laser diode. In the on-control operation, the system controller 11 switches the output power level of the light beam of the laser diode between the relatively low level at the reproduction mode and the relatively high level at the recording mode.

When the recording operation is carried out on the magneto-optical disc 1, an analog audio signal which is supplied as a recording signal to an analog input terminal 17A is converted to a digital signal in an A/D converter 18, and then supplied to the encoder/decoder 14 to be subjected to the audio compression encode processing. Alternatively, a digital audio signal as a recording signal is supplied from a digital input terminal 17D to the encoder/decoder 14 to be subjected to the audio compression encode processing.

The recording data which are compressed by the encoder/decoder 14 are temporarily written into the buffer memory 13 by the memory controller 12, read out therefrom at a predetermined timing and supplied to the encoder/decoder 8. In the encoder/decoder 8, the supplied data are subjected to the encode processing such as the CIRC encode, the EFM modulation, etc., and then supplied to a magnetic head driving circuit 6.

The magnetic head driving circuit 6 supplies a magnetic head driving signal to the magnetic head 6a in accordance with the encoded recording data. That is, N- or S-pole vertical magnetic field is applied from the magnetic head 6a onto the magneto-optical disc 1 on the basis of the recording data. At this time, the system controller 11 outputs a control signal to the optical head 3 to output a light beam of recording level (high level).

A reference numeral 19 denotes an operation input unit provided with a plurality of keys which can be manipulated or operated by a user, and a reference numeral 20 denotes a display unit composed of a liquid crystal display (LCD) element. The operation input unit 19 has a recording key, a reproduction key, a stop key, an AMS (Auto Music Scan) key, a search key, etc. which can be manipulated by the user.

When the recording/reproducing operation is carried out on the magneto-optical disc 1, it is necessary to read out the management information recorded on the disc 1, that is, P-TOC (pre-recorded TOC) data and U-TOC (user TOC) data. The system controller 11 identifies the address of an area to be recorded on the disc 1 and the address of an area to be reproduced in accordance with these management information. The management information is held or stored in the buffer memory 13. Therefore, the buffer memory 13 is divided into a storage area for temporarily storing the recording data/reproducing data as described above and an area for storing the management information.

When the disc 1 is loaded in the apparatus, the system controller 11 starts the reproducing operation of the innermost peripheral side of the disc 1 on which the management information is recorded, thereby reading out the P-TOC data and the U-TOC data as described above, and then stores these read-out P-TOC data and the U-TOC data into the buffer memory 13, whereby the system controller 11 is allowed to refer to these management information when the recording/reproducing operation is afterwards carried out on the disc 1.

The U-TOC data are rewritten in accordance with data recording or deletion. The system controller 11 edits the U-TOC data stored in the buffer memory 13 every time the recording/deleting operation is carried out, and also it performs a rewriting operation on an U-TOC area on the disc 1 at a prescribed timing in accordance with the rewriting operation.

Next, an audio data sector, and P-TOC sector and U-TOC sector for managing the recording/reproducing operation of audio data, which are recorded in a sector data format on the disc 1, will be described.

2. P-TOC Sector

Using the P-TOC data, an area indication is determined for a recordable area on the disc (recordable user area), management of an U-TOC area, etc. When the disc 1 is a pre-recorded optical disc which is exclusively used for reproduction, music data which are recorded in a physically uneven form, that is, in the form of pits can be managed by the P-TOC data.

FIG. 5 shows a sector (sector 0) for P-TOC data which are repetitively recorded in an area for P-TOC data, for example, in a read-only area (an area used exclusively for reproduction) at the innermost peripheral side of the disc.

Four sectors 0 to 4 are provided for the P-TOC sectors, however, the sector 1 and subsequent sectors are optionally provided.

The data area of a sector of the P-TOC (4 bytes×588= 2352 bytes) is provided at the head position thereof with four bytes of a synchronizing pattern composed of one-byte data which are all "0" or "1", addresses representing a cluster address, a sector address, etc., and these constitute a header as shown in FIG. 5.

Next to the header, an identifier ID which is represented by ASCII codes corresponding to letters "MINI" is provided at a prescribed address position to indicate that this area is an area on which the P-TOC data are recorded.

Next to the identifier ID are further recorded information on a disc type, a recording level, the music number of a first recorded piece of music (First TNO), the music number of a last recorded piece of music (Last TNO), a read-out start address $LO_A$, a sector use status (Used sectors), a power calibration area start address $PC_A$, a start address $UST_A$ of the U-TOC sector, a start address $RST_A$ of a recordable area, etc.

Subsequently, there is provided a corresponding table indication data having table pointers (P-TNO1 to P-TNO255) with which the respective recorded pieces of music are allowed to correspond to part tables in a management table portion as described later.

In an area next to the corresponding table indication data portion is provided a management table portion having 255 part tables of (01h) to (FFh) in correspondence to the table pointers (P-TNO1 to P-TNO255). In this specification, a numerical value affixed with "h" is represented by hexadecimal notation.

Each of the part tables contains a start address serving as a start point for a part, an end address serving as an end point for the part, and mode information for the part (track mode).

The part is defined as a track portion on which data which are continuous on a time axis are recorded at a physically continuous position.

The mode information of the track in each part table contains information as to whether the part is set to a rewrite prohibition mode or a data copy prohibition mode, information as to whether the information is audio information, information on a type of monaural/stereo, etc.

Each of the part tables (01h) to (FFh) represents the content of the part with the table pointers (P=TNO1 to P-TNO255). That is, a part table (for example, (01h)) is recorded as a table pointer P-TNO1 for a first piece of music. In this case, the start address of the part table (01h) is a start address for a recording position of the first piece of music. Likewise, the end address thereof is an end address of the recording position of the first piece of music. Furthermore, the track mode information is information for the first piece of music. As the table pointer is actually provided a numerical value which can represent a part table with a byte position in the P-TOC sector 0.

Likewise, with respect to a second piece of music, the start and end addresses of the recording position of the second piece of music and the track mode information therefor are recorded in a part table, for example, (02h) which is represented by a table pointer P-TNO2.

Likewise, 255 pieces of music can be managed on the P-TOC because the tables pointers are provided from P-TNO1 to P-TNO255. By forming the P-TOC sector 0 as described above, the music data of a desired piece of music can be accessed and reproduced at the reproduction time, for example.

When the magneto-optical disc is a recordable/reproducible magneto-optical disc, no pre-recorded music data area exists. Therefore, the corresponding table indication table data portion and the management table portion as described above are not used, and thus all the bytes are wholly set to "00h".

However, with respect to a hybrid type disc having a read-only area (which is exclusively used for reproduction) as an area on which music data or the like are beforehand recorded, and a magneto-optical area on which data are recordable, the corresponding table indication data portion and the management table portion as described above are used to manage the music data in the read-only area.

3. U-TOC Sector

Next, the U-TOC sector will be described.

FIG. 6 shows the format of a sector of the U-TOC, and it is used as a data area in which management information are recorded. The management information is used to manage music data which are recorded by an user and unrecorded areas (free areas) on which music data are newly recordable. Sectors 0 to 7 may be provided as an U-TOC sector, however, the sector 1 and subsequent sectors are optionally provided.

For example, when a piece of music is required to be recorded on the disc 1, the system controller 11 searches a free area on the disc on the basis of the data of the U-TOC and records data based on audio data in the free area. At the reproduction time, on the basis of the data of the U-TOC the system controller 11 identifies an area on which music data to be reproduced are recorded, and controls the optical head 3 to access the area, thereby performing the reproducing operation.

The U-TOC sector 0 shown in FIG. 6 is first provided with a header like the P-TOC, and next provided with data on a maker code, a model code, the music number of the first piece of music (First TNO), the music number of the last piece of music (Last TNO), a sector use status, a disc serial number, a disc ID, etc.

In order to identify an area of music data which are recorded by user's recording audio signals, a free area, etc. on the basis of the matching with the management table portion as described later, areas on which various table pointers (P-DFA, P-EMPTY, P-FRA, P-NO1 to P-TNO255) are recorded are prepared as the corresponding table indication data portion.

Part tables of 255 are provided as management table portions (01h) to (FFh) which correspond to the table pointers (P-DFA to P-TNO255). Like the P-TOC sector 0 shown in FIG. 5, a start address serving as a start point for a part, an end address serving as an end point for the part, and mode information (track mode) for the part are recorded in each part. With respect to the U-TOC sector 0, in some cases a part represented by each part table may be subsequently linked to another part. Accordingly, in the U-TOC sector 0 can be recorded link information representing a part table in which the start address and the end address of a part to be linked are recorded.

In this type recording and/or reproducing apparatus, even when data of a piece of music are recorded physically discontinuously, that is, over plural parts, no trouble occurs in the reproducing operation because the reproduction is continued while accessing the data over parts. Therefore, there is a case where in order to use a recordable area with high efficiency, music data are recorded while divided into plural parts.

Accordingly, link information is provided to indicate another part table to be linked on the basis of a number (01h)–(FFh) (actually represented with a numeral value which is a byte position in the U-TOC sector 0 through a prescribed calculation processing) supplied to each part table, thereby linking the part tables.

With respect to music data which are beforehand recorded on the disc, the music data are generally recorded while not divided into plural parts. Therefore, all the link information in the P-TOC sector is set to "(00h)" as shown in FIG. 5.

That is, in the management table portion in the U-TOC sector 0, one part table represents one part. For example, with respect to music data which is constructed by linking three parts, the positions of the respective parts are managed by three part tables which are linked to one another with the link information.

The content of each of the part tables (01h) to (FFh) in the management table portion of the U-TOC sector 0 is represented with the table pointers (P-DFA, P-EMPTY, P-FRA, P-TNO1 to P-TNO255) in the corresponding table indication data portion as follows.

The table pointer P-DFA represents a defective area on the magneto-optical disc 1, and it specifies a part table or the head part table of plural part tables, each of which corresponds to a track portion (=part) having a defective area due to scratches. That is, when a part containing a defective area exists, any one of (01h) to (FFh) is recorded in the table pointer P-DFA. In a part table indicated by the table pointer P-DFA, a part having a defective area is indicated with the start and end addresses thereof. When another defective part exists, another part table is indicated as link information to the former part table, and a part having a defective area is also indicated in the latter part table. If no other subsequent part having a defective area exists, the link information is set to "(00h)" to indicate no subsequent defective part.

The table pointer P-EMPTY represents an unused part table or the head part table of plural unused part tables in the management table portion. When an unused part table exists, any one of (01h) to (FFh) is recorded as the table pointer P-EMPTY. When plural unused part tables exist, these part tables are successively specified with link information from the part table which is indicated by the table pointer P-EMPTY, whereby all the unused part tables are linked to one another on the management table portion.

The table pointer P-FRA represents a data writable free area (containing a deletion area) on the magneto-optical disc 1, and it specifies a part table or the head part table of plural part tables, each of which corresponds to a track portion (=part) serving as a free area. That is, when a free area exists, any one of (01h) to (FFh) is recorded in the table pointer P-FRA, and a part serving as a free area is indicated with the start and end addresses thereof in a corresponding part table. When plural parts serving as free areas exist, that is, when plural part tables corresponding to free areas exists, these part tables are successively indicated with link information until a part table whose link information is set to "(00h)".

Figure 7:
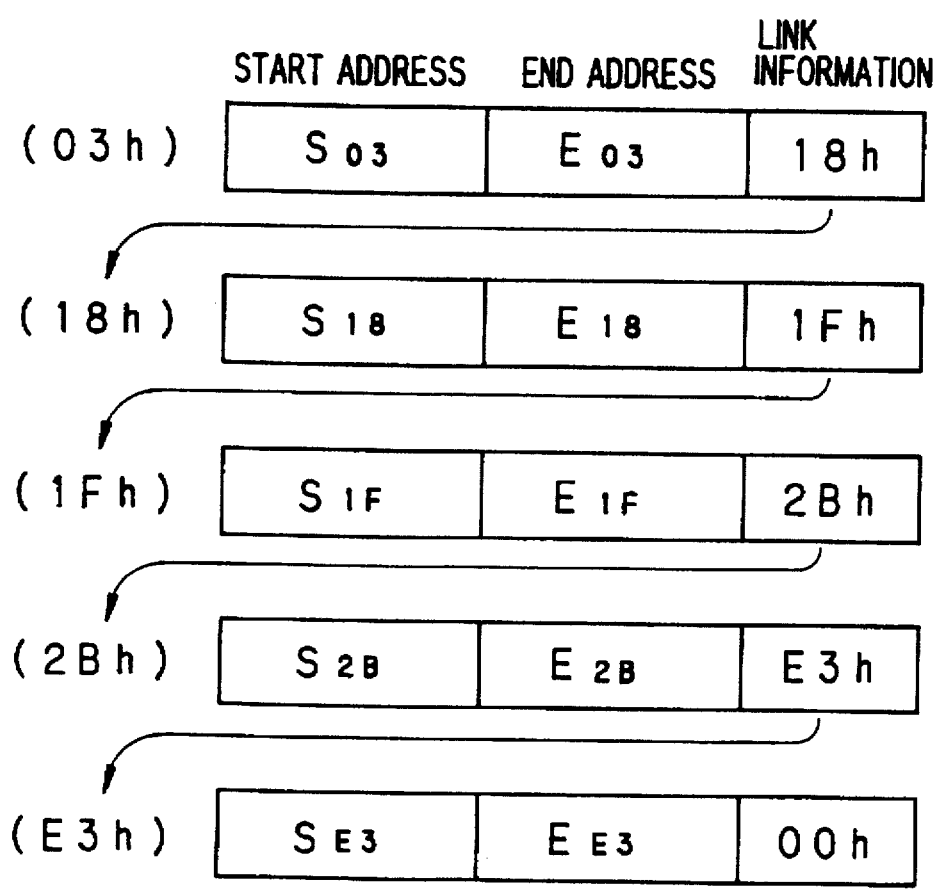
FIG. 7 is a diagram showing a management format of the U-TOC of the disc.

FIG. 7 is a schematic diagram showing a management state of parts serving as free areas. In FIG. 7, parts of (03h), (18h), (1Fh), (2Bh) and (E3h) are free areas, and subsequently to the corresponding table indication data P-FRA, the link state of these parts of (03h), (18h), (1Fh), (2Bh) and (E3h) is managed with link information. The defective areas and the unused part tables as described above are managed in the same management mode as described above.

If the magneto-optical disc has not been recorded with audio data of pieces of music and has no defect, the part table (01h) is indicated by the table pointer P-FRA, whereby the whole recordable user area on the disc is indicated as a free area. In this case, the remaining part tables (02h) to (FFh) are unused. Therefore, the part table (02h) is indicated by the table pointer P-EMPTY, and the part table (03h) is indicated with link information of the part table (02h). The subsequent part tables are successively linked until the part table (FFh) in the same manner as described above. In this case, the link information of the part table (FFh) is set to "(00h)" to indicate no subsequent linkage.

For the part table (01h), the start address of the recordable user area is recorded as the start address of the part table (01h), and an address just before a read-out start address is recorded as the end address of the part table (01h).

The table pointers P-TNO1 to P-TNO255 represent the music data of pieces of music which are recorded on the magneto-optical disc 1 by the user. For example, the table pointer P-TNO1 indicates a part table for specifying a part or the head part of plural parts on time axis, on which the music data of the first piece of music are recorded.

For example, when the first piece of music is recorded as a single part on the disc without being divided into plural parts, a storage area for the first piece of music is recorded as the start and end addresses of a part table which is indicated by the table pointer P-TNO1.

Furthermore, when the music data of the second piece of music are discretely recorded on the disc while divided into plural parts, the respective parts are indicated in a time order to indicate the recording position of the second piece of music. That is, the other part tables are successively indicated in time order with the link information from the part table indicated by the table pointer P-TNO2, and this linkage is continued until a part table whose link information is set to "(00h)".

As described above, all the parts on which the music data of the second piece of music are recorded are successively indicated, and thus using the data of the U-TOC sector 0, the optical head 3 and the magnetic head 6a are controlled to access these parts when the second piece of music is reproduced or data are overwritten into the area for the second piece of music, whereby the music data of the second piece can be continuously output from the discretely-disposed parts and the recording operation can be performed while effectively using the recording area.

As described above, the area management on the disc is performed by the P-TOC data as described above, and the music data recorded in the recordable user area, the free areas, etc. are managed by the U-TOC data.

4. Audio Data Sector

Figure 8:
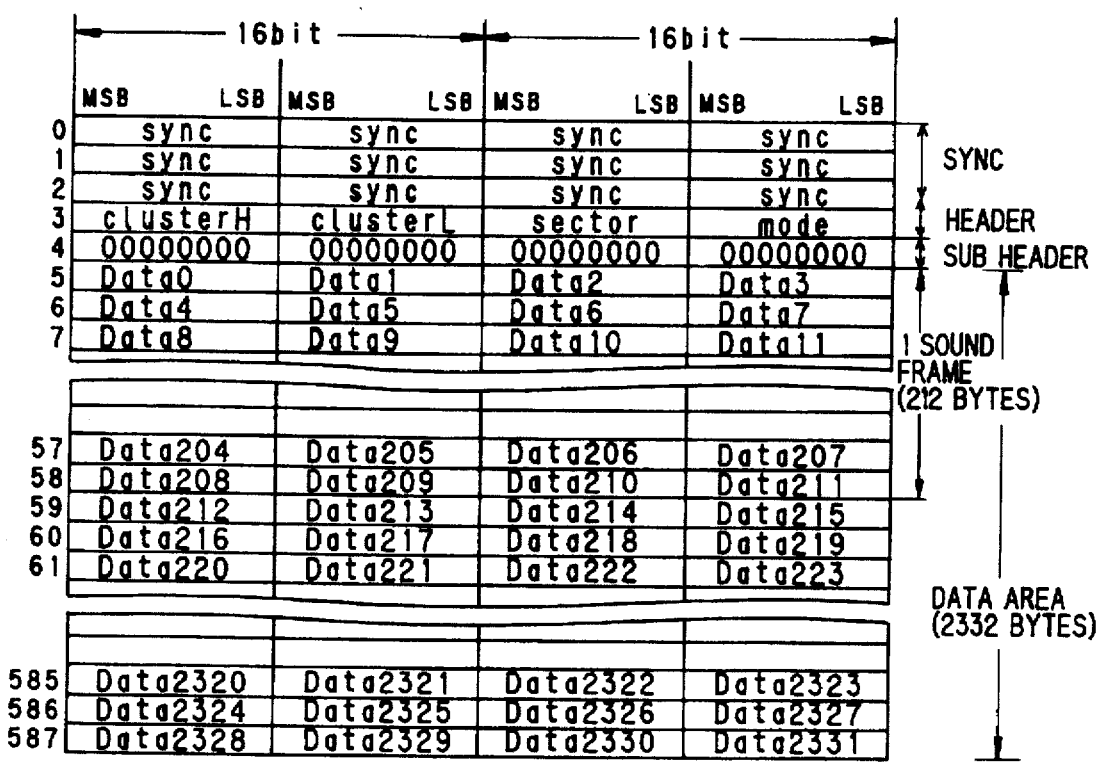
FIG. 8 is a diagram showing a data sector of the disc.

The format of a sector in which audio data are recorded is set as shown in FIG. 8.

In the sector (2352 bytes), 12 bytes at the head thereof are used as synchronizing data, next 3 bytes are set for a cluster address and a sector address, and next 1 byte is used for a mode. These 16 bytes are set as a header.

Figure 1:
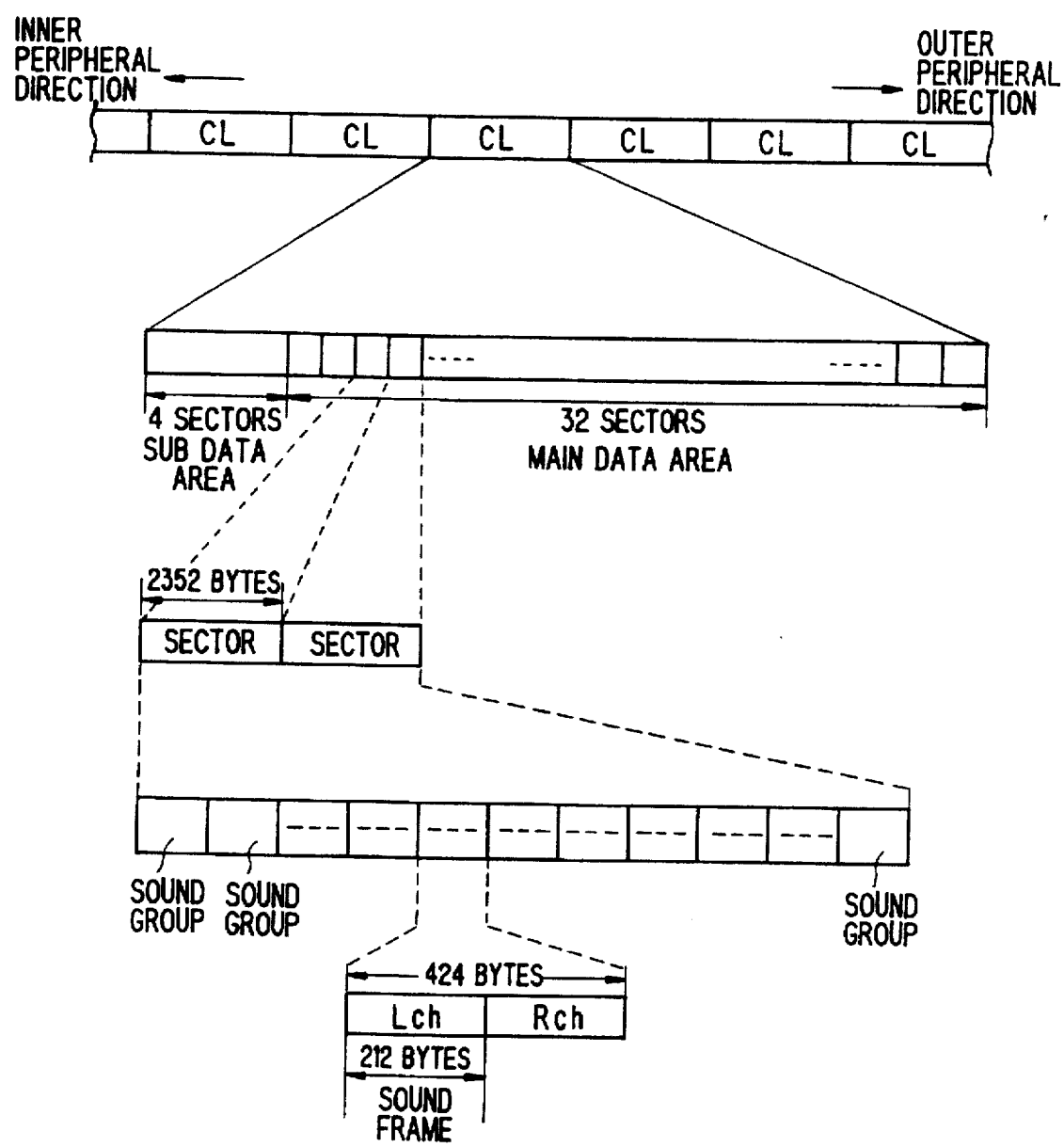
FIG. 1 is a diagram showing a track format of a disc.

Furthermore, 4 bytes subsequently to the header is set as a sub header, and bytes subsequent to the sub header, that is, 2332 bytes from 21st byte to 2352nd byte of the sector are used as a data area (Data-0 to data2331). Eleven units of sound frames of 212 bytes as shown in FIG. 1 are recorded in the data area of 2332 bytes.

5. Storage Area of Buffer Memory

Figure 9:
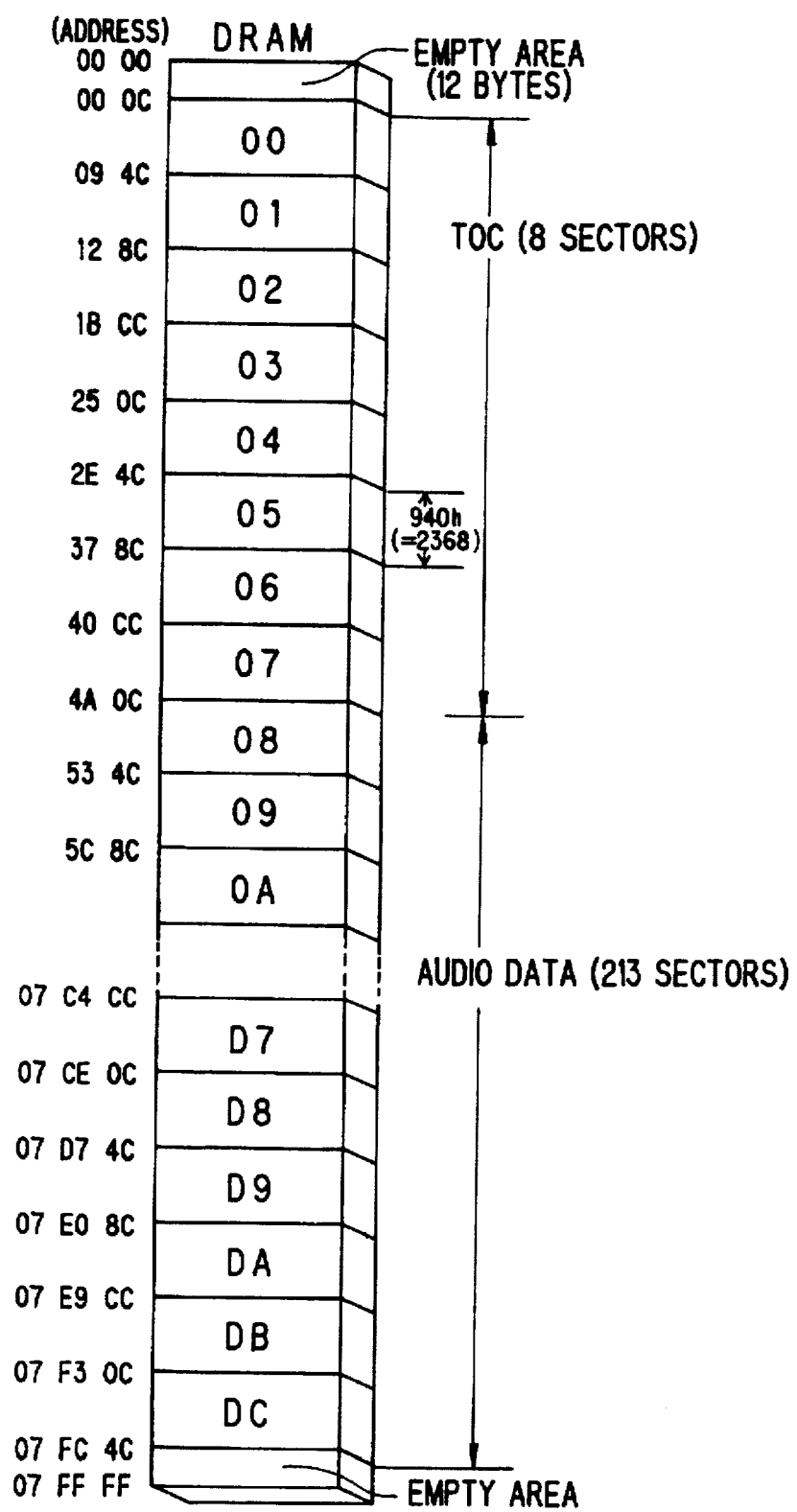
FIG. 9 is a diagram showing a storage area of a buffer memory in the recording and/or reproducing apparatus of the embodiment.

In this embodiment, the buffer memory 13 is used as shown in FIG. 9 to store these sectors (TOC sector and data sector). The storage capacity of the buffer memory 13 is set to 4 Mbits, and TOC data of 8 sectors can be stored. 12 bytes (addresses 0000h to 000Ch) at the head position are set as an empty area, and subsequent 18944 bytes from addresses 000Ch to 4A0Bh are used to store TOC data. That is, eight areas from an area 00 to an area 07 serve to hold the TOC data. As shown in FIG. 5 or FIG. 6, each area composes of 2368 bytes, and thus additive data of 16 bytes can be stored in addition to data of one sector of 2352 bytes.

Furthermore, addresses from 4A0Ch to 07FC4Bh are used to store data based on audio signals, that is, areas 08 to DC each composing of 2368 bytes are used for storage and read-out of audio data sectors. In this case, each area composes of 2368 bytes, and thus additive data of 16 bytes can be stored in addition to data of one sector composing of 2352 bytes as shown in FIG. 8. Addresses from 07FC4Ch to 07FFFFh are set as an empty area.

Here, 000Ch to 07F30Ch which are represented as the head addresses of the respective areas from the area 00 to the area DC are calculated on the basis of the count value of the sector which is a write-in/read-out target. That is, representing the sector count value by Ns, the sector address is set to (940h ×Ns+0Ch), a value of "+0Ch" is an offset corresponding to the empty area at the head. Accordingly, for example, the head address of the area 08 is calculated as (940h×08h+0Ch=4A0Ch).

Figure 10:
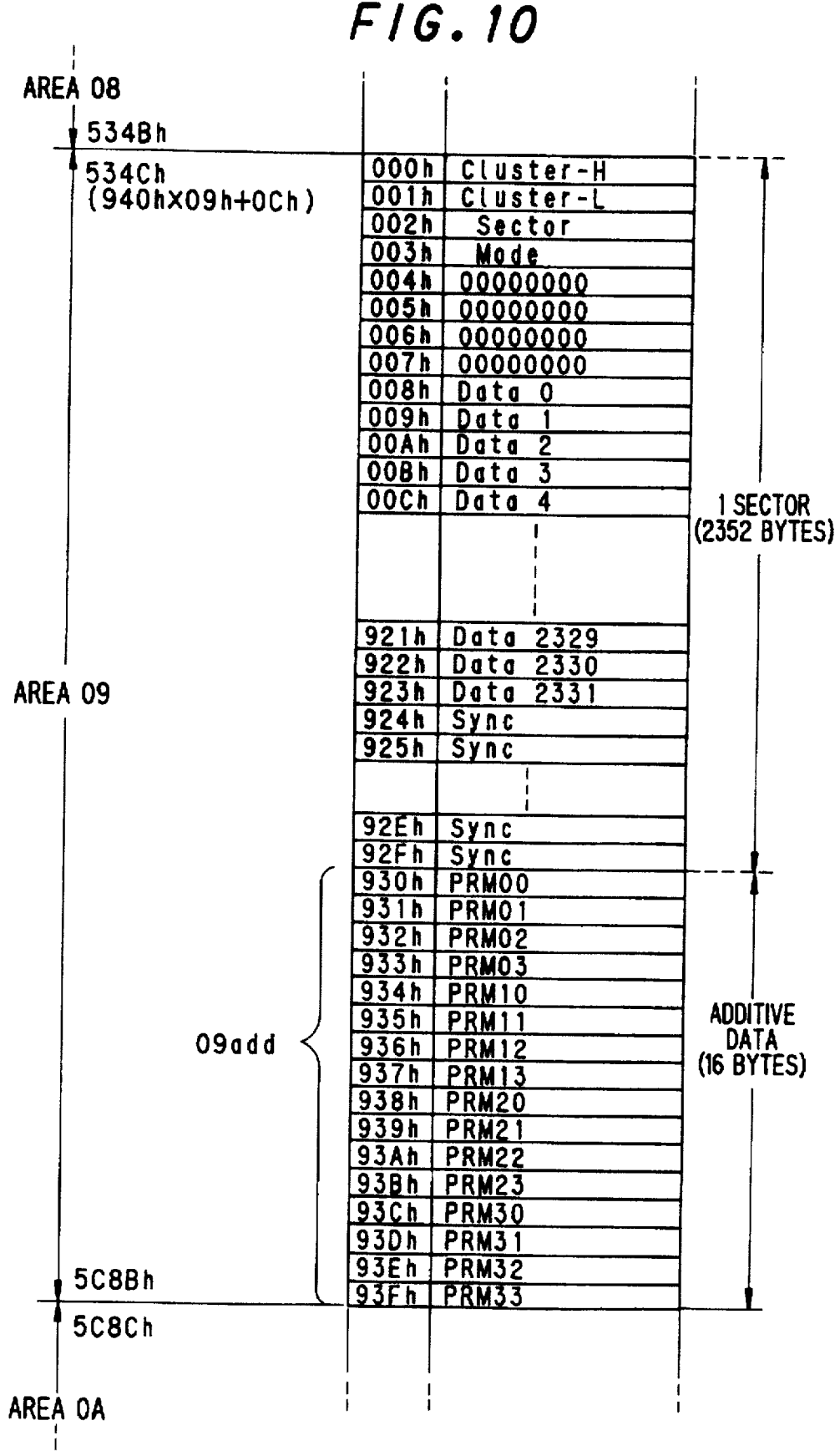
FIG. 10 is a diagram showing a storage area of a buffer memory in the recording and/or reproducing apparatus of the embodiment.

The internal construction of each area of 2368 bytes (for example, area 09) is shown in FIG. 10.

The area 09 is stored with audio data, that is, such a sector as shown in FIG. 8. The head address of this area 09 is 534Ch, and 2368 bytes (000h to 93Fh) from the head address until an address 5C8Bh are used as shown in FIG. 10.

That is, since the write-in operation of the sector is carried out in accordance with synch detection, a cluster address, a sector address and a mode are first stored, then a sub header of 4 bytes is stored, and then data Data0 to Data2331 are successively stored. Thereafter, the sync is written in, and one sector (2352 bytes) are stored.

Here, 16 bytes remain in the area after the sector is stored, and these 16 bytes (930h to 93Fh) are used as a storage area (additive area 09 add) for a sector parameter so that additive data can be also stored therein.

The address of each byte is obtained by adding the head address (sector address) of the area with a byte address. For example, the address of Data0 in the area 09 is set to (940h×09h+0Ch)+008h=534Ch+008h=5354h.

As described above, additive areas (00 add to DC add) in which additive data can be stored in correspondence to the sector data are provided to the respective areas (area 00 to area DC) in the buffer memory 13. Accordingly, the track number, an advance time, a track mode, link informations, error informations, etc. which are incident to the sector can be held in correspondence to the sector with these additive areas. In this case, when sector data are read out, additive data which are incident to the sector data are also read out and used to manage various operations.

6. Construction of Memory Controller

Next, the construction of the memory controller 12 to use the buffer memory 13 in the mode as described will be described.

Figure 3:
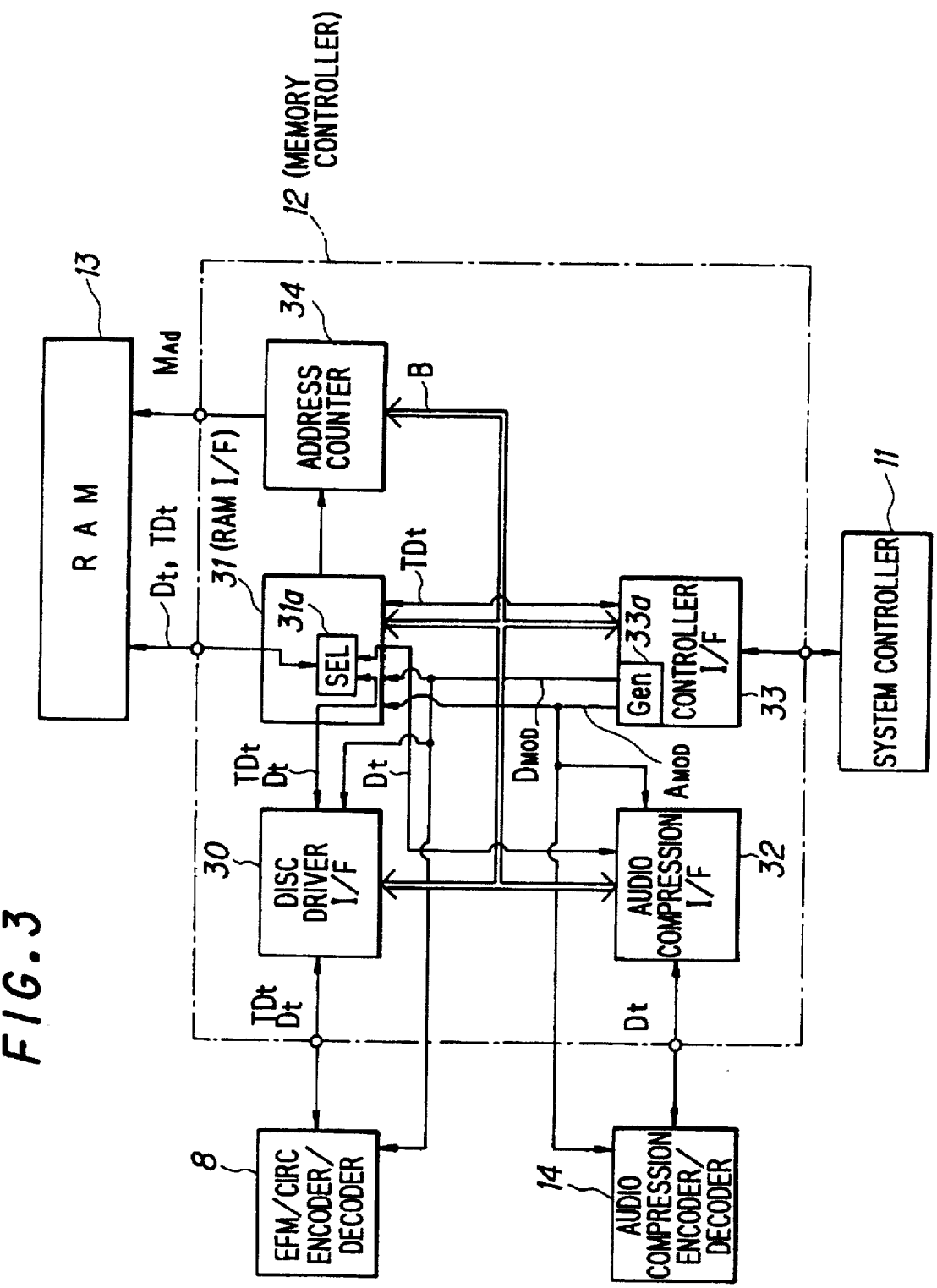
FIG. 3 is a block diagram showing a memory controller in the embodiment of the present invention.

FIG. 3 is a block diagram showing the internal construction of the memory controller 12.

A disc drive interface unit 30 holds and receives and transmits recording/reproduction data Dt and TOC data TDt from and to the disc drive side, that is, the encoder/decoder 8.

A memory data interface unit 31 performs data write-in/read-out to the buffer memory 13 and holds these data. The data to be written in/read out are the recording/reproducing data Dt and the TOC data TDt.

An audio compression interface unit 32 serves to hold and receive and transmit the recording/reproducing data Dt from and to the audio compression unit, that is, the encoder/decoder 14.

A controller interface unit 33 serves as an interface to the system controller 11. The controller interface unit 33 receives and transmits the TOC data TDt from and to the system controller 11, receives the control signal from the system controller 11 and holds these data.

An address counter 34 generates a write-in address/read-out address ($M_{Ad}$) on the basis of address indication data which are supplied through the controller interface unit 33, mode information, sync data of a sector which is detected by the disc drive interface unit 30 or the audio compression interface unit 32, a byte count signal supplied from the memory data interface unit 31, etc., and supplies the write-in address/read-out address to the buffer memory 13. The drive interface unit 30, the memory interface unit 31, the audio compression interface unit 32, the controller interface unit 33 and the address counter 34 are connected to one another through a control bus B.

The memory data interface unit 31 is provided with a selector 31a. The data transmission between the memory data interface unit 31 and the disc drive interface unit 30 and the data transmission between the memory data interface unit 31 and the audio compression interface unit 32 are carried out through the selector 31a. That is, a data input/output destination for the buffer memory is the selector 31a, and the disc drive interface unit 30 or the audio compression interface unit 32 is selected.

The controller interface unit 33 is provided with a mode signal generator 33a. The reproduction mode/recording mode is set on the basis of a signal from the mode signal generator 33a.

The mode signal is output to two paths. The mode signal on one path is a disc-side mode signal $D_{MOD}$ for the disc drive interface unit 30 and the encoder/decoder 8, and the mode signal on the other path is an input/output side mode signal $A_{MOD}$ for the audio compression interface unit 32 and the encoder/decoder 14. The disc-side mode signal $D_{MOD}$ and the input/output side mode signal $A_{MOD}$ are also supplied to the memory data interface unit 31, and these signals are used to perform a switching operation of the selector 31a in the memory data interface unit 31.

With the mode signals $D_{MOD}$ and $A_{MOD}$ on the two paths, both the disc drive interface unit 30 and the encoder/decoder 8 and both the audio compression interface unit 32 and the encoder/decoder unit 14 can be individually operated in different modes.

When both the disc drive interface unit 30 and the encoder/decoder 8 are set to the reproduction mode with the disc-side mode signal $D_{MOD}$, the data read out from the disc 1 is subjected to the EFM/CIRC decoding processing, and then written into the buffer memory 13 through the memory data interface unit 31.

On the other hand, when these are set to the recording mode with the disc-side mode $D_{MOD}$, the disc drive interface unit 30 receives the data read out from the buffer memory 13 through the memory data interface unit 31, and the data output from the disc drive interface unit 30 is subjected to the EFM/CIRC encode processing and then supplied to the magnetic head driving circuit 6.

When both the audio compression interface unit 32 and the encoder/decoder 14 are set to the recording mode with the input/output side mode signal $A_{MOD}$, the data based on signals input from the input terminal 17A or 17D are subjected to the audio compression encode, and then written into the buffer memory 13 through the audio compression interface unit 32 and the memory data interface unit 31.

On the other hand, when these are set to the reproduction mode with the input/output side mode signal $A_{MOD}$, the audio compression interface unit 32 receives the data read out from the buffer memory 13 through the memory data interface unit 31, and the data output from the audio compression interface unit 32 are subjected to the audio compression decode processing by the encoder/decoder 14, and then output from the output terminal 16A or 16D.

7. Operation of Memory Controller

As described above, both the disc drive interface unit 30 and the encoder/decoder unit 8 as a pair and both the audio compression interface unit 32 and the encoder/decoder unit 14 as a pair are operated in different modes with the two-path mode signals $D_{MOD}$ and $A_{MOD}$. In addition, the TOC data storage area and the audio data storage area are separately set in the buffer memory 13 as shown in FIG. 9. Therefore, in the recording and/or reproducing apparatus of this embodiment, the data based on signals input from the input terminal 17D or 17A can be stored into the buffer memory 13 while the TOC data are read out from the disc 1 and written into the buffer memory 13.

The operation of the memory controller 13 to perform the above operation will be described with reference to FIG. 4.

Figure 4:
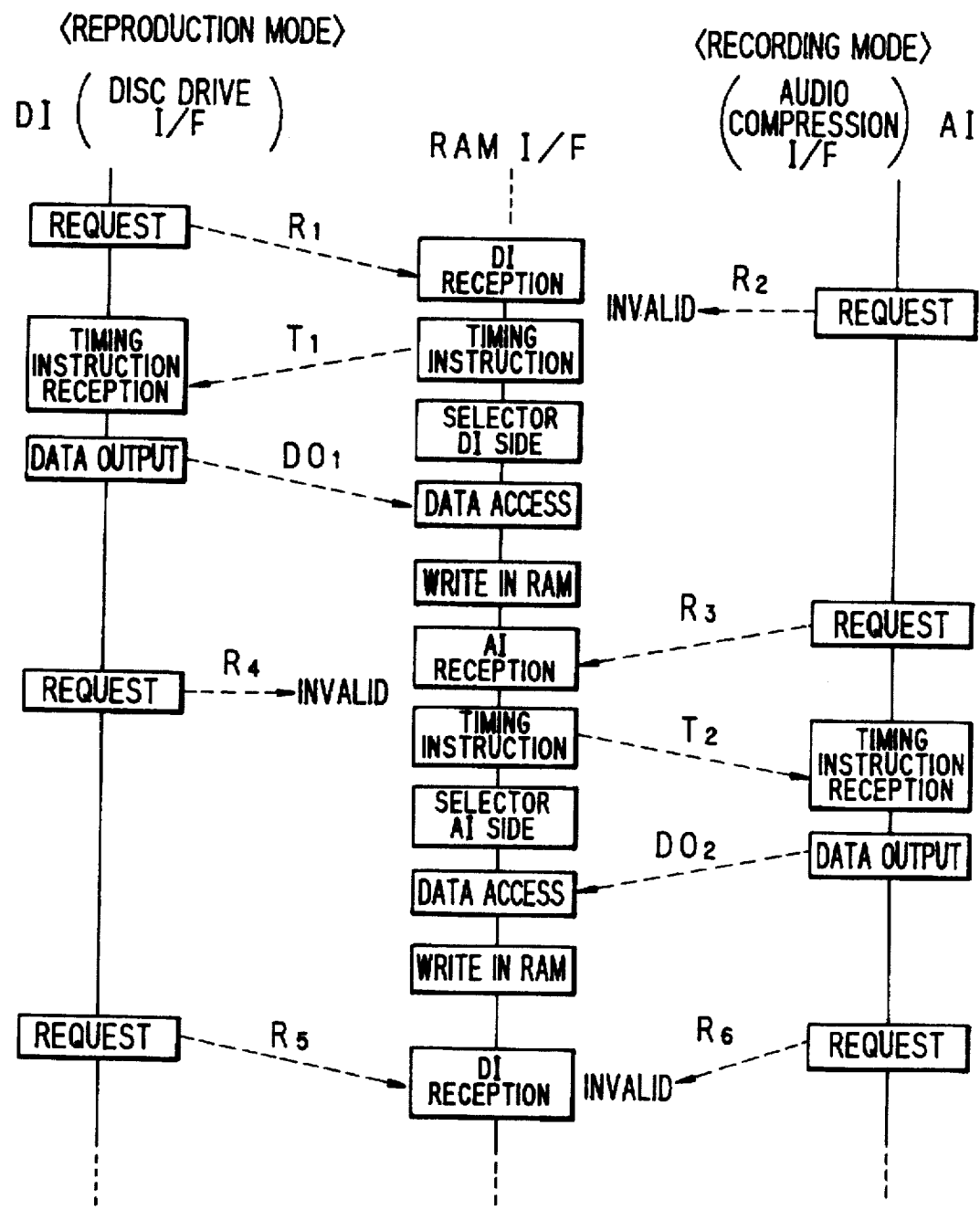
FIG. 4 is a diagram showing an operation of the memory controller of the embodiment.

In FIG. 4, DI represents the disc drive interface unit 30, and AI represents the audio compression interface unit 32. In order to write the TOC data read out from the disc 1 into the buffer memory 13, the disc drive interface unit 30 and the encoder/decoder 8 are set to the reproduction mode by the disc side mode signal $D_{MOD}$. Accordingly, the encoder/decoder 8 functions as an EFM/CIRC decoder, and the disc drive interface unit 30 serves to transmit the decoded data into the memory data interface unit 31 and stores them into the buffer memory 13.

Since the data based on the input audio signals are written into the buffer memory 13, the audio compression interface unit 32 and the encoder/decoder 14 are set to the recording mode by the input/output side mode signal $A_{MOD}$. Accordingly, the encoder/decoder 14 functions as an audio compression encoder, and the audio compression interface unit 32 transmits the encoded data to the memory data interface unit 31 and stores them into the buffer memory 13.

In this case, the memory data interface unit 31 waits for a data-reception request from the disc drive interface unit 30 and the audio compression interface unit 32, and it is operated in accordance with the request.

FIG. 4 shows a case where the disc drive interface unit 30 first outputs a request $R_1$ to the memory data interface unit 31. The memory data interface unit 31 makes a request reception of the request $R_1$ from the disc drive interface unit 30 to enter a write-in operation of writing the data from the disc drive interface unit 30 into the buffer memory 13. At this time, even when a request $R_2$ is output from the audio compression interface unit 32, the request $R_2$ is not received, and thus it is invalidated.

The memory data interface unit 31 transmits to the disc drive interface unit 30 a timing instruction $T_1$ for instructing a data transmission timing to the disc drive interface unit 30. The selector 31a is set to the disc drive interface unit 30 side.

When receiving the timing instruction $T_1$, the disc drive interface unit 30 starts data output $DO_1$ at the indicated timing. The memory data interface unit 31 receives the data output $DO_1$ through the selector 31, and supplies and writes the received data into the buffer memory 13. At this time, the write-in address is set and output by the address counter 34, and an address representing a storage area for TOC data is output because the data supplied from the disc drive interface unit 30 are TOC data.

After the data write-in operation from the memory data interface unit 31 into the buffer memory 13 is completed, the memory data interface unit 31 is set to a request receivable state. It is assumed that a request $R_3$ is output from the audio compression interface unit 32 in the above state. The memory data interface unit 31 makes a request reception of the request $R_3$ from the audio compression interface unit 32 to enter the data write-in operation from the audio compression interface unit 32 into the buffer memory 13. At this time, even when a request $R_4$ is output from the disc drive interface unit 30, the request $R_4$ is not received, and it is invalidated.

The memory data interface unit 31 transmits to the audio compression interface unit 32 a timing instruction $T_2$ for instructing a data transmission timing. The selector 31a is set to the audio compression interface unit 32 side. When receiving the timing instruction $T_2$, the audio compression interface unit 32 starts a data output $DO_2$ at the indicated timing.

The memory data interface unit 31 receives the data output $DO_2$ through the selector 31a, and supplies and writes the received data into the buffer memory 13. At this time, the write-in address is set and output by the address counter 34, however, the address for an audio data storage area is output because the data at this time are audio data which have been subjected to the audio compression processing by the encoder/decoder 14. The memory data interface unit 31 is set to a request receivable state after the data write-in operation from the memory data interface unit 31 into the buffer memory 13 is completed.

If requests $R_5$ and $R_6$ from the disc drive interface unit 30 and the audio compression interface unit 32 are simultaneously input to the memory data interface unit 31, the memory data interface unit 31 preferentially receives the request $R_5$ from the disc drive interface unit 30 and thus invalidates the request $R_6$ from the audio compression interface unit 32. This is because the read-out of the TOC data required for the recording operation is superior.

Subsequently, the memory data interface unit 31 is successively contacted with each of the disc drive interface unit 30 and the audio compression interface unit 32 in accordance with the request in the same manner as described above to continue the data write-in operation into the buffer memory 13.

The memory controller 12 carries out the data write-in operation into the buffer memory 13 as described above, whereby the data based on the input audio signals can be accumulated into the buffer memory 13 while reading out the TOC data when the disc is loaded. That is, this means that the data based on the audio signals can be input and recorded immediately after the disc is loaded into the apparatus.

That is, when data are recorded on the magneto-optical disc, the TOC data must be first read out. In a conventional apparatus, it is impossible to read input audio data into the buffer memory 13 during a period (for example, 2 to 3 seconds) for which the read-out operation of the TOC data is performed because the audio compression interface unit 32 is also set to the reproduction mode, so that the data recording cannot be performed for the period.

However, according to this embodiment, when the recording start operation is carried out just after the disc is loaded into the apparatus, the disc drive interface unit 30 is set to the reproduction mode to read out the TOC data. At the same time, the audio compression interface unit 32 is set to the recording mode to perform accumulation of data based on audio signals. Accordingly, the audio data which are input during a period for which the TOC data are read out from the magneto-optical disc are also held as valid data in the buffer memory 13, and then the disc drive interface unit 30 is set to the recording mode to record the accumulated audio data onto the disc 1 after the TOC data read-out operation is completed. As a result, the audio data can be recorded on the magneto-optical disc without being interrupted at the head portion thereof to meet an emergent recording operation just after the disc is loaded into the apparatus.

In this embodiment, the disc drive interface unit 30 side may be operated in the recording mode while the audio compression interface unit 32 side is operated in the reproduction mode. That is, while the data read out from the disc 1 are sufficiently accumulated in the buffer memory 13 and these data are output to the audio compression interface unit 32 side, the disc drive interface unit 30 side can be operated in the recording mode to write, for example, U-TOC data on the disc 1 during a period for which the data read-out operation from the disc 1 is not carried out.

With this operation, the U-TOC data can be renewed at all times on the disc 1 even in the midst of editing or the like, and thus it can be avoided that U-TOC data which have been recorded/edited in the buffer memory 13 are deleted due to sudden break-down of a power source, and thus the recording/editing operation comes to nothing.

The present invention is not limited to the above embodiment, and various modifications containing alteration of an actual operating procedure may be made without departing from the subject matter of the present invention. In the above embodiment, the magneto-optical disc is used as a recording medium, however, any disc-shaped recording medium other than the magneto-optical disc may be used insofar as it is a writable disc-shaped recording medium.

What is claimed is:

1. A recording and/or reproducing apparatus for a disc-shaped recording medium on which management data to manage recorded data are recorded, said apparatus comprising:

recording and/or reproducing means for recording data on the disc-shaped recording medium and/or reproducing recorded data from the disc-shaped recording medium;

storing means for temporarily storing data reproduced by said recording and/or reproducing means and temporarily storing data which are supplied to said recording an/or reproducing means to be recorded on the disc-shaped recording medium, said storing means including a first storing area for storing the data reproduced from the disc-shaped recording medium by said recording and/or reproducing means, or storing the data which are supplied to said recording and/or reproducing means to be recorded on the disc-shaped recording medium, and a second storing area for storing management data which are read out from the disc-shaped recording medium by said recording and/or reproducing means; and storage control means for controlling writing and reading operations of data into and from said storing means, wherein when data are recorded on the disc-shaped recording medium by said recording and/or reproducing means, said storage control means time-divisionally stores into said first storing area of said storing means the data to be recorded on the disc-shaped recording medium while simultaneously time-divisionally storing into said second storing area of said storing means the management data which are read out from the disc-shaped recording medium by said recording and/or reproducing means.

2. A recording and/or reproducing apparatus according to claim 1, wherein said storage control means performs the data write-in operation into said second storing area of said storing means more preferentially than the data write-in operation into said first storing area of said storing means.

3. A recording and/or reproducing apparatus for a disc-shaped recording medium on which management data to manage recorded data are recorded, said apparatus comprising:

recording and/or reproducing means for recording data on the disc-shaped recording medium and/or reproducing recorded data from the disc-shaped recording medium;

storing means for temporarily storing data reproduced by said recording and/or reproducing means and temporarily storing data which are supplied to said recording an/or reproducing means to be recorded on the disc-shaped recording medium, said storing means including a first storing area for storing the data reproduced from the disc-shaped recording medium by said recording and/or reproducing means, or storing the data which are supplied to said recording and/or reproducing means to be recorded on the disc-shaped recording medium, and a second storing area for storing management data which are read out from the disc-shaped recording medium by said recording and/or reproducing means;

storage control means for controlling and reading operations of data into and from said storing means, wherein when data are recorded on the disc-shaped recording medium by said recording and/or reproducing means, said storage control means stores into said first storing area of said storing means the data to be recorded on the disc-shaped recording medium while storing into said second storing area of said storing means the management data which are read out from the disc-shaped recording medium by said recording and/or reproducing means;

control means for controlling the recording and reproducing operations of said recording and/or reproducing means and controlling the operation of said storage control means;

wherein said storage control means comprises first interface means for receiving and transmitting control data from and to said control means, second interface means which receives and transmits data from and to said recording and/or reproducing means and whose data input/output mode is switched by said first interface means, third interface means whose data input/output mode is switched by said first interface means, selection means for selecting one of said second interface means and said third interface means as a data input/output destination to said storing means, and address data generating means for generating write-in address data and data read-out address data for said storing means; and wherein at the data recording time onto the recording medium, said first interface means sets said second and third interface means to an input mode on the basis of the control data from said control means, and wherein in the data recording operation onto the recording medium, the first interface means sets the second and third interface means to the input mode on the basis of the control data from said control means, and in combination with said selection means, said first interface means performs a selective switching operation between an operation of writing into said storing means the data input through said second interface means on the basis of the address data from said address data generating means and an operation of writing into said storing means the data which are input through said third interface means to be recorded on the recording medium, on the basis of the address data from said address data generating means, whereby the data supplied through said recording and/or reproducing means and the data to be recorded on the recording medium are stored in said storing means.

4. A recording and/or reproducing apparatus according to claim 3, wherein said selection means writes the data from said second interface means into said storing means when data write-in timings of the data from said second and third interface means into said storing means are coincident with each other.

* * * * *

UNITED STATES PATENT AND TRADEMARK OFFICE
CERTIFICATE OF CORRECTION

PATENT NO. : 5,675,559
DATED : October 7, 1997
INVENTOR(S) : YASUAKI MAEDA ET AL.

It is certified that error appears in the above-identified patent and that said Letters Patent is hereby corrected as shown below:

In Col. 18, line 37, add --writing-- after "controlling".

Signed and Sealed this

Twentieth Day of January, 1998

Attest:

BRUCE LEHMAN

Attesting Officer

Commissioner of Patents and Trademarks